Jan. 17, 1939. F. CONLON ET AL 2,144,329

RECEPTACLE

Filed Oct. 29, 1937

INVENTORS.
FLORENCE CONLON
EDWARD W. SUVANTO.
BY
ATTORNEY.

Patented Jan. 17, 1939

2,144,329

UNITED STATES PATENT OFFICE 2,144,329

RECEPTACLE

Florence Conlon and Edward W. Suvanto,
San Francisco, Calif.

Application October 29, 1937, Serial No. 171,666

2 Claims. (Cl. 119—1)

This invention relates to improvements in receptacles and has particular reference to an animal's commode.

The principal object of this invention is to produce a receptacle whereby an animal may use the same as a depositary in a building.

A further object is to produce a device of this character which will be sanitary, one which may be easily cleaned, and one from which odors will not arise.

A further object is to produce a device of this character which will partially hide the animal from view while the animal is using the device.

Other objects and advantages will be apparent during the course of the following description.

In the accompanying drawing forming a part of this specification and in which like numerals are employed to designate like parts throughout the same, Fig. 1 is a top plan view of our device;

Figure 1:
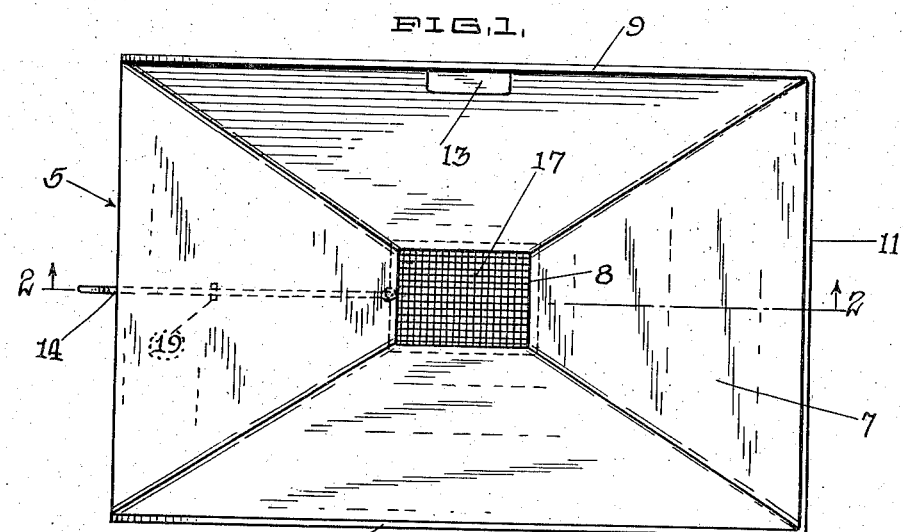

Many animals are kept in houses, apartments, stores, and the like places where it is almost impossible at times for the animal to get outdoors to perform the body functions.

Applicants have, therefore, devised a receptacle in the form of a commode, which receptacle will receive both the solid and liquid excretions from the animal, separating them and retaining them out of sight and in such a manner that obnoxious odors will not arise therefrom.

In the accompanying drawing wherein for the purpose of illustration is shown a preferred embodiment of our invention, the numeral 5 designates a receptacle within which is located an inner receptacle 6. At 7 we have shown a cover for the receptacle 5, which cover is provided with an opening 8. By viewing Figs. 2 and 3, it will be noted that the cover 7 is formed on an incline, all parts inclining toward the opening 8. Secured to the cover 7 are side walls 9, 11, and 12, which form a guard as well as a screen. Upon one of these sides is secured a block 13 which may act as a scent board for male dogs.

Figure 2:
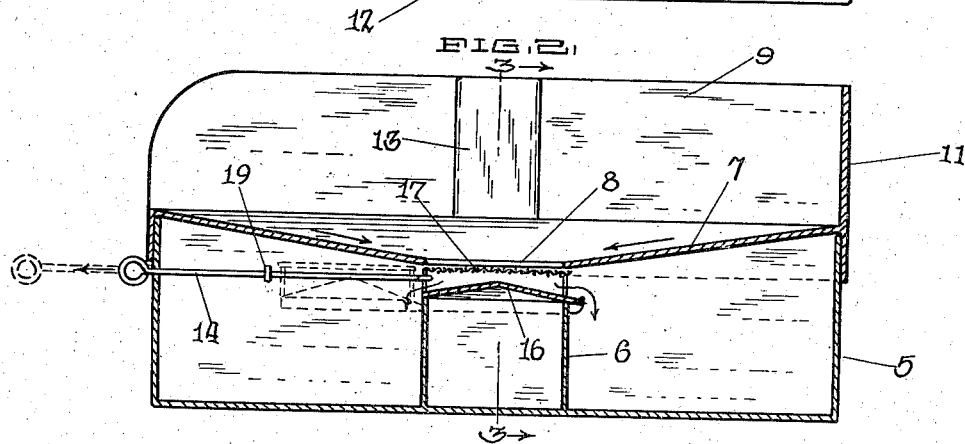
Fig. 2 is a cross sectional view taken on the line 2—2 of Fig. 1.
Figure 3:
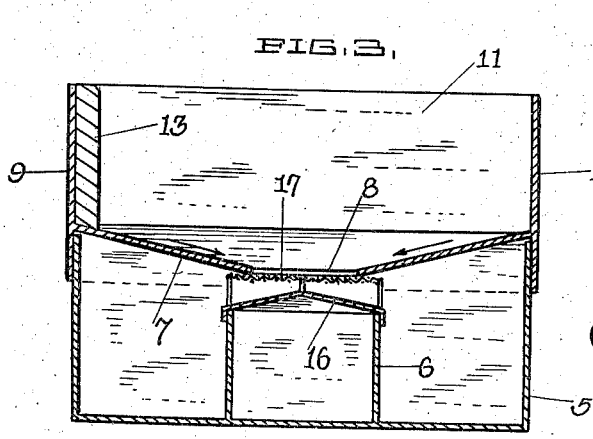
Fig. 3 is a cross sectional view taken on the line 3—3 of Fig. 2.
Figure 4:
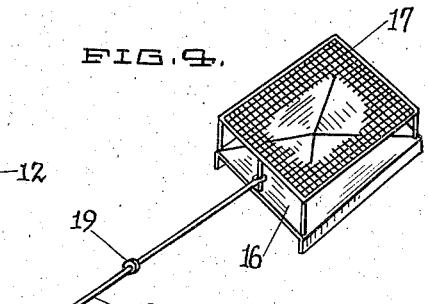
Fig. 4 is a perspective view of the inner receptacle cover and opening screen.

Referring now to Figs. 2 and 4, it will be noted that a rod 14 has secured thereto a sliding cover 16 which rests upon the top of the inner receptacle 6. It will also be noted that this cover 16 has inclined surfaces, the purpose of which will be hereinafter described. Supported above the cover 16 is a screen 17, which lies directly under the opening 8 when the parts are in the full line position of Fig. 2.

The result of this construction is that when a dog or other animal uses our device, any liquids deposited by the animal will run down the inclined cover 7, through the screen 17, onto the sliding cover 16, and then into the receptacle 5, and any solid droppings of the animal will rest upon the screen 17. When the rod 14 is moved in the dotted line position of Fig. 2, the screen 17 will be moved from beneath the opening 8, and the cover 16 will be removed from the inner receptacle 6. Consequently, any solids upon the screen will be dropped into the inner receptacle, or any solids which may be upon the inclined cover may be brushed into the inner receptacle. When the screen is returned to a point beneath the opening 8, the cover 16 will also be moved over the inner receptacle, which will close the inner receptacle and prevent odors from rising therefrom. The screen 17 serves to prevent the animal from stepping through the opening 8, as well as serving to separate the liquids from the solids.

A stop 19, formed upon the rod 14, serves to limit the movement of the screen 17 and the cover 16.

It is obvious that the entire device may be washed with a hose or under a faucet, thus enabling a person to keep the device in a sanitary condition.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a device of the character described, a receptacle, a cover positioned above said receptacle, a second receptacle within said first-mentioned receptacle, said cover having downwardly inclined surfaces leading to an opening formed therethrough, a screen positioned beneath said opening, the upper surface of said screen being close to the opening and overlying said inner receptacle, a cover for said inner receptacle and means for moving said screen from beneath said opening.

2. In a device of the character described, a receptacle for the collection of liquids, a second receptacle for the collection of solids, a cover overlying said receptacles, said cover having inclined surfaces from its outer margin toward an opening formed therethrough, said opening overlying said receptacle for solids, a screen underlying said opening, the upper surface of said screen being close to the opening, a sliding cover attached to said screen, and means for moving said sliding cover and said screen from beneath said opening, whereby when said receptacle for solids is uncovered, said screen will be moved from beneath said opening.

FLORENCE CONLON.
EDWARD W. SUVANTO.